United States Patent
Singh (10) Patent No.: US 7,403,225 B2
(45) Date of Patent: Jul. 22, 2008

(54) SYSTEM AND METHOD FOR AUTOMATICALLY ANNOTATING IMAGES IN AN IMAGE-CAPTURE DEVICE

(75) Inventor: Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 729 days.

(21) Appl. No.: 10/889,485

(22) Filed: Jul. 12, 2004

(65) Prior Publication Data

US 2006/0007315 A1     Jan. 12, 2006

(51) Int. Cl.
*H04N 5/76* (2006.01)
*G03B 17/24* (2006.01)

(52) U.S. Cl. .................... 348/231.5; 396/310
(58) Field of Classification Search ............ 348/231.99, 348/231.2–231.6; 396/310, 315, 319, 321
See application file for complete search history.

(56) References Cited

U.S. PATENT DOCUMENTS

| | | | |
|---|---|---|---|
| 5,734,706 A | 3/1998 | Windsor et al. | |
| 6,690,883 B2 * | 2/2004 | Pelletier | 396/321 |
| 7,009,643 B2 * | 3/2006 | Nakamura et al. | 348/231.4 |
| 7,248,285 B2 * | 7/2007 | Needham | 348/207.1 |
| 2001/0030695 A1 | 10/2001 | Prabhu et al. | |
| 2002/0101519 A1 * | 8/2002 | Myers | 348/232 |
| 2003/0016865 A1 | 1/2003 | Lopez et al. | |
| 2003/0058353 A1 * | 3/2003 | Tsue | 348/231.2 |
| 2003/0184653 A1 * | 10/2003 | Ohkubo | 348/207.1 |
| 2004/0021780 A1 | 2/2004 | Kogan | |
| 2004/0114042 A1 * | 6/2004 | Paolini et al. | 348/207.99 |
| 2004/0153553 A1 * | 8/2004 | Chotkowski et al. | 709/229 |

* cited by examiner

*Primary Examiner*—Lin Ye
*Assistant Examiner*—Timothy J Henn (57) ABSTRACT

The invention provides a system and method for automatically annotating pictures in an image-capture device. The system includes an image capture system that is configured to capture an image. A memory is coupled to the image capture system and is configured to maintain a user-specific database. A processor is coupled to the memory and is configured to annotate the image with a tag based on data from the user-specific database.

24 Claims, 6 Drawing Sheets

SYSTEM AND METHOD FOR AUTOMATICALLY ANNOTATING IMAGES IN AN IMAGE-CAPTURE DEVICE

FIELD OF THE INVENTION

The present invention relates to metadata, and more particularly to automatically annotating images from an image-capture device.

BACKGROUND OF THE INVENTION

One problem with current database technologies is in retrieving information from them. Creating the right search parameters is typically the key to finding the right data in a database. However, even with the right search parameters the data must be catalogued in a manner consistent with those search parameters. If the data lacks appropriate information for cataloguing, it cannot be effectively located in a search.

In photography, a user may take pictures at different times and places. Searching through the pictures one by one is inefficient and slow, so having an automated search for pictures in a database is desirable. Sometimes the picture does not conjure up a memory of where or what is in the picture, so conventional systems offer several methods for annotating pictures for database storage and search.

The first method is with the date and time of day. However, this is not a very useful search feature, as most dates are not particularly easy to recall.

Another method involves marking the position of the camera with latitude and longitude coordinates and annotating the picture with the coordinates. As with the date and time of day feature, most users are not particularly aware of their coordinates, so reference to those coordinates is not helpful.

Another method involves annotation by the user at the time the picture is taken. However, most cameras are not designed for text input, so this type of annotation is cumbersome and time consuming. Furthermore, most users do not want to pause from viewing scenery or participating in an event to enter such text.

Accordingly, what is needed is a system and method for automatically annotating images from an image-capture device, especially with information relevant to the user or easily searchable at a later time. The present invention addresses such a need.

BRIEF SUMMARY OF THE INVENTION

The present invention provides a system and method for automatically annotating images from an image-capture device. The system includes an image capture system that is configured to capture an image. A memory is coupled to the image capture system and is configured to maintain a user-specific database. A processor is coupled to the memory and is configured to annotate the image with a tag based on data from the user-specific database.

According to a method and system disclosed herein, the present invention automatically annotates pictures with language relevant to the user, for example language used by the user to describe an event. The user is most likely to remember their own words and be able to use those words in a search to find the pictures relating to the words. Additionally, information in a user-specific database such as an address book is likely to provide useful search parameters and may be annotated to a picture as well as more easily remembered during a search. Over the course of image management, a user may be able to view the annotations rather than have to open up each picture, especially when searching for a particular picture or type of picture.

DETAILED DESCRIPTION OF THE INVENTION

The present invention relates to automatically annotating images from an image-capture device. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
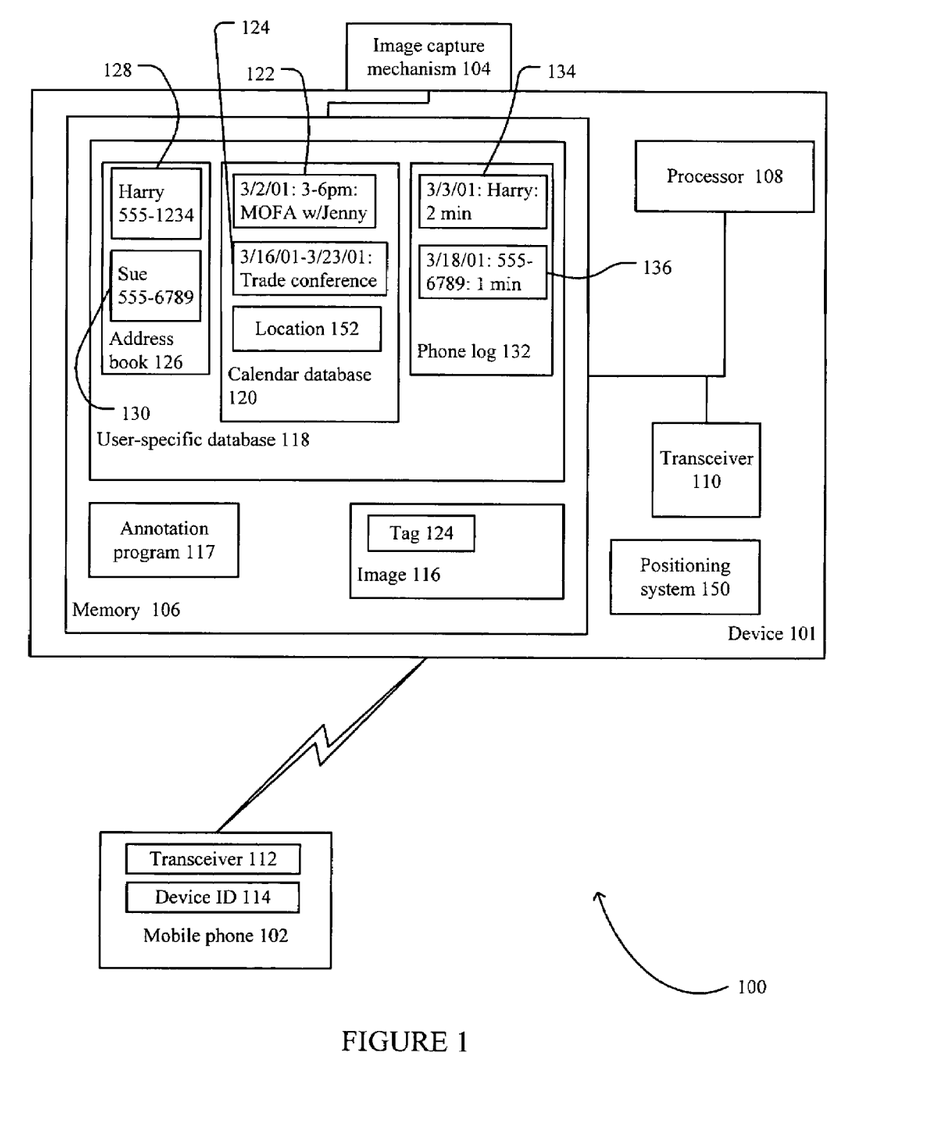
FIG. 1 is a block diagram illustrating one embodiment of a system for automatically annotating images from an image-capture device.

FIG. 1 is a block diagram illustrating one embodiment of system 100 for automatically annotating images. System 100 includes device 101 and mobile phone 102. Device 101 may be a digital or conventional camera, a mobile phone, personal digital assistant (PDA), an electronic device (including a personal computer) connected to an image capture mechanism, or any combination of the above. Furthermore, device 101 is not meant to be limited to a single device, rather device 101 may be a network of devices where one device captures images and another stores and annotates the images remotely.

Device 101 includes image capture mechanism 104, for example a lens/aperture system, video, digital and film mediums. Image capture mechanism captures an image or series of images and transmits the images to memory 106. Memory 106 is connected to and managed by processor 108, which may be a single or multiple processors. Transceiver 110 is also connected to and managed by processor 108. Transceiver 110 operates over a wireless transmission medium, in this case the same medium as mobile phone 102. Device 101 may also communicate with mobile phone 102 using a wireless transmission medium, for example BLUETOOTH. Although this example illustrates a mobile phone, any electronic device that communicates over a wireless transmission medium may be applied in place of a mobile phone. Additionally, a mobile phone typically has other, regional transmission mediums such as CDMA or GSM (as opposed to BLUETOOTH, which is a local medium). For the purposes of the invention, any medium or system that identifies mobile phone 102 as being within a certain distance, for example a few hundred feet, of device 101 is sufficient.

User-specific database 118 may reside in memory 106 and contains data specific to a user. Data in a user-specific database 118 is typically in a form that is unique to that user because the data is input into the database in a manner most likely to be remembered by the user. Examples of data in user-specific database 118 include calendar database 120, address book 126 and phone log 132.

Mobile phone 102 includes transceiver 112 for communicating over the wireless transmission medium common to mobile phone 102 and device 101, and device identification (ID) 114. Device ID 114 is anything uniquely identifying mobile phone 102 to device 101, and in one embodiment is the phone number of mobile phone 102.

Figure 2:
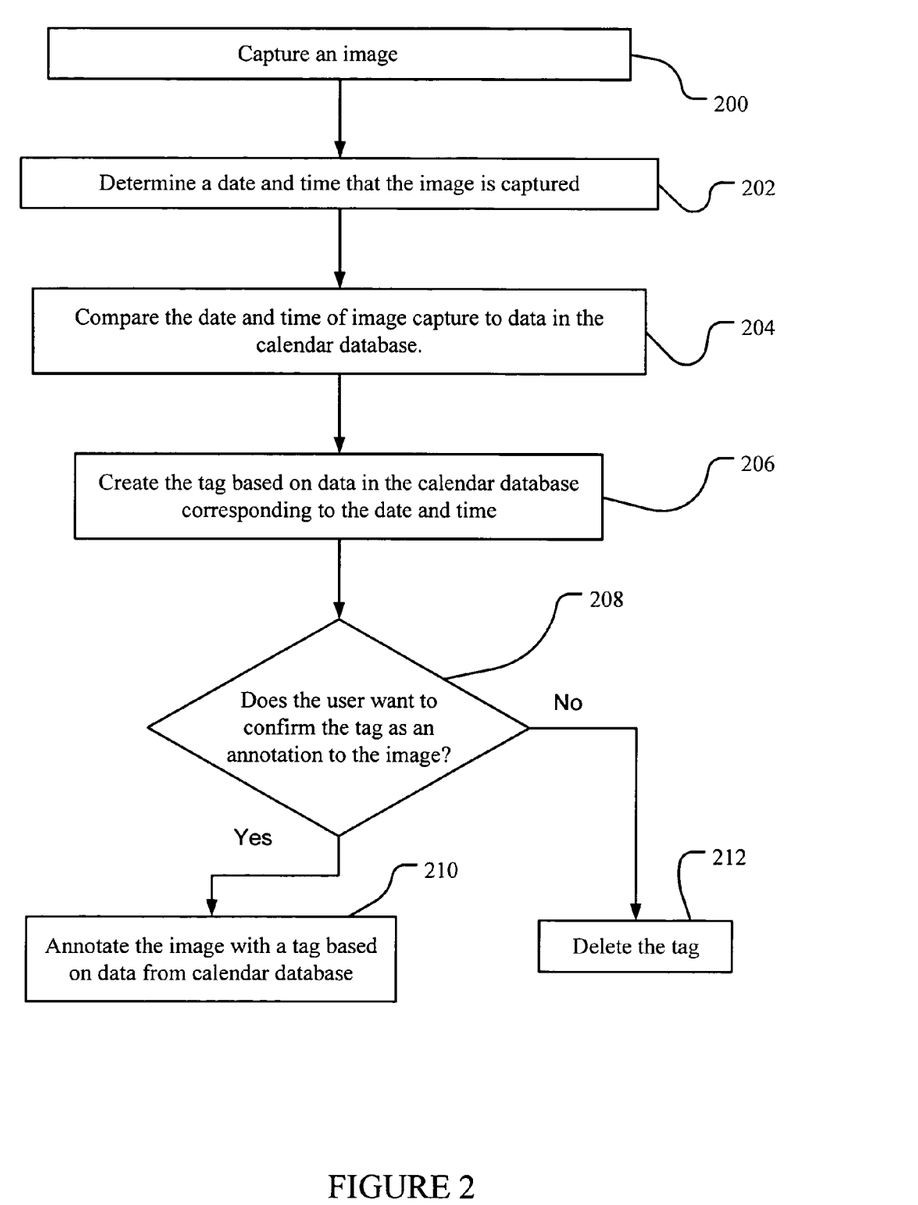
FIG. 2 is a flow diagram illustrating one method of implementing the invention with the system of FIG. 1.

FIG. 2 is a flow diagram illustrating one embodiment for implementing the process of automatically annotating images using the system of FIG. 1. FIG. 2 is discussed along with the corresponding structure of FIG. 1. The process begins with image capture mechanism 104 capturing (taking) image 116, as described in block 200. As previously mentioned, image 116 may be a single image, several images, or a video. For purposes of example, assume image 116 is of a clown standing next to a concession stand.

In block 202, annotation program 117 determines a date and time that image 116 is captured. Processor 108 typically executes annotation program 117, which may reside in memory 106. Processor 108 may have an internal clock mechanism or may be connected to one (not shown). In the above example, image 116 was taken on Mar. 2, 2001 at 4 PM. Once the date and time of the image capture is determined, then in block 204, annotation program 117 compares the date and time to information in user-specific database 118. In this embodiment, user-specific database 118 includes calendar database 120. In this example, calendar database includes entries 122 and 124. Entry 122 is, for example, for Mar. 2, 2001, from 3-6 PM "MOFA w/Jenny," which the user understands to mean that he is visiting the Museum of Fine Arts with his daughter Jenny. Entry 124 is, for example, for Mar. 16, 2001 through Mar. 23, 2001 "Trade conference," which the user understands to mean that he is attending for that week the national trade conference on gambling and slot machines held in Las Vegas each year. Annotation program 117 matches the time and day determined from block 202 with entry 122 because the date of Mar. 2, 2001 and the time of 4 PM falls within the boundary of entry 122.

In block 206, annotation program 117 reads the entries in calendar database 120 and generates tag 124. Continuing with the above example, tag 124 reads "MOFA w/Jenny," taken from entry 122. One skilled in the art will recognize that tag 124 does not need to match entry 124 verbatim, however the user is most likely to remember an event if the language is of their own choosing, or some close derivative. If the time and date do not match any entry within calendar database 120 then no tag is created. Alternatively, some time period specified by the user before or after an event may still trigger creation of tag 124. Although tag 124 is illustrated as a part of image 116, at this point image 116 has not yet been annotated with tag 124.

In block 208, annotation program 117 determines if the user wants to confirm tag 124 as an annotation to image 116. Block 208 is optional, as the user may turn off the confirm function, so that all tags are added. If tag 124 is appropriate, then in block 210, annotation program 117 annotates image 116 with tag 124. Alternatively, tag 124 could be added but marked somehow as unconfirmed by the user, if that is the case. Additionally the user could make standard text entries or edits to tag 124 using conventional systems to further clarify or describe image 116.

In block 212, if the user determines in block 208 that tag 124 is inappropriate, then annotation program 117 deletes tag 124. Continuing with the above example, the user instead went with his daughter to the circus because the MOFA was closed for renovations. He did not want to confuse the circus with tag 124 indicating "MOFA w/Jenny" and knew he would remember that the clown picture could only have been taken at the circus.

Figure 3:
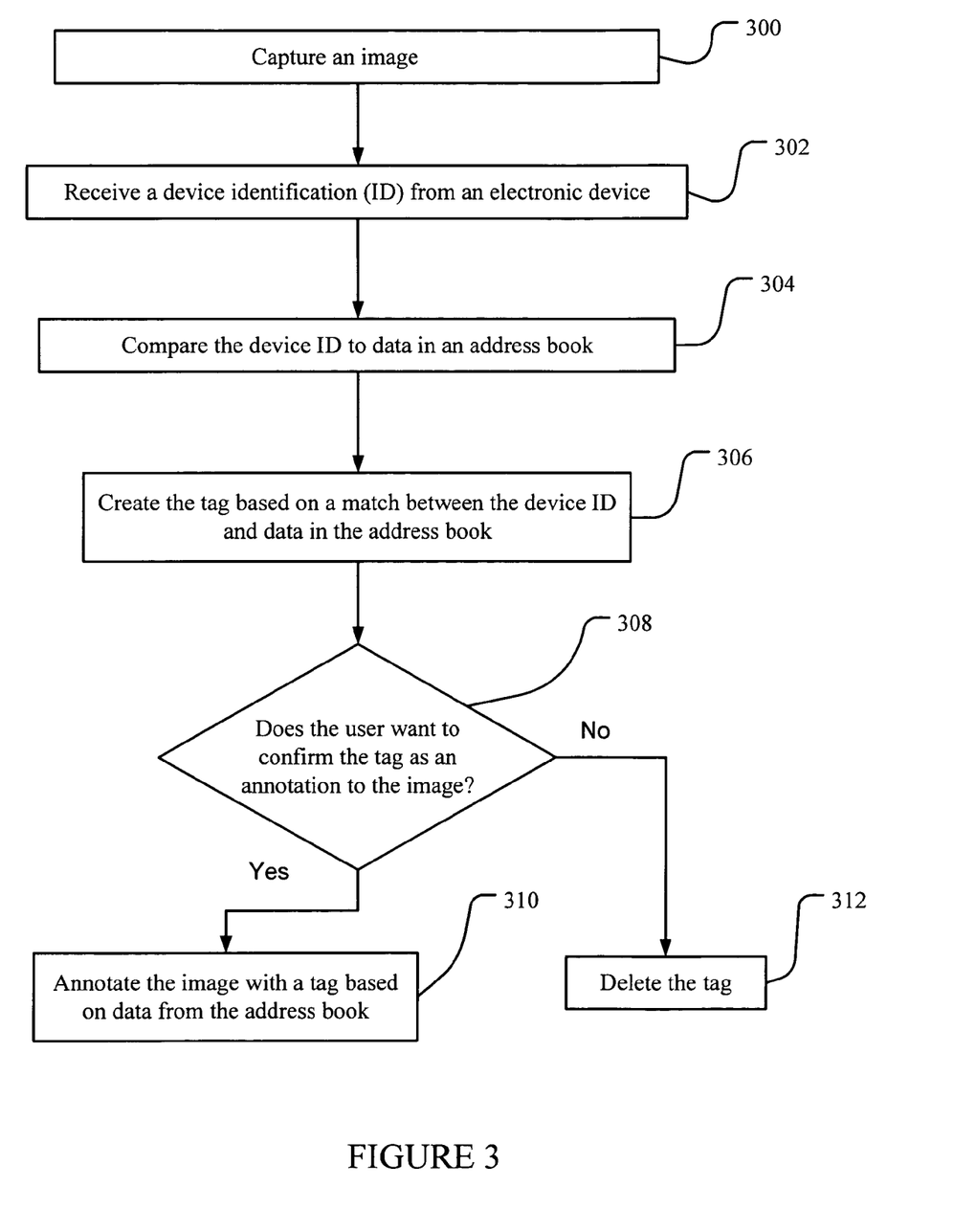
FIG. 3 is a flow diagram illustrating one method of implementing the invention with the system of FIG. 1.

FIG. 3 is a flow diagram illustrating a second embodiment for implementing the process of automatically annotating images using the system of FIG. 1. FIG. 3 is discussed along with the corresponding structure of FIG. 1. The process begins with image capture mechanism 104 capturing image 116, as described in block 300. In this example, assume that image 116 is of the user standing in a park while the user went on a walk with his sister Sue.

Sue has mobile device 102, with transceiver 112 and device ID 114. In this example, device ID 114 is the telephone number of mobile phone 102, which is 555-6789. One of ordinary skill in the art will recognize that many different device ID's are possible, the telephone number being one example of a device ID. Device ID 114 is transmitted by transceiver 112, over a short-range transmission medium, such as BLUETOOTH.

According to one aspect of the invention, the distance between mobile phone 102 (and other electronic devices) and device 101 is important as device IDs from devices within a certain proximity of device 101 are used to compare to user-specific database 118 for a match. Short-range transmission mediums work to provide an acceptable range, as do other systems and methods that would determine the proximity between mobile phone 102, for example, and device 101.

In block 302, transceiver 110 receives device ID 114 from mobile phone 102. Then, in block 304, annotation program 117 compares device ID 114 to data in address book 126. Address book 126 includes entries 128 and 130. Entry 128 is "Harry 555-1234" while entry 130 is "Sue 555-6789." Typically an address book contains more information, however, the name of an individual associated with a phone number is relevant to the invention. Annotation program 117 matches device ID 114, which is 555-6789, with data in entry 130, "Sue 555-6789." Harry, with a mobile phone having a number of 555-1234, is several miles away and therefore out of range of transceiver 110. However, had Harry's mobile phone been within range, both entries 128 and 130 could have been selected. Additionally, other electronic devices may be in range of device 101 at the time of image capture, but because those devices have device IDs not in address book 126 they are preferably not added to tag 124.

In block 306, annotation program 117 creates tag 124 that reads "Sue" because of the match between device ID 124 and entry 130 in address book 126. Had Harry been within range, tag 124 could read "Sue & Harry."

In block 308, annotation program 117 determines if the user wants to confirm tag 124 as an annotation to image 116. Block 308 is optional, as the user may turn off the confirm function, so that all tags are added. If the tag is appropriate, then in block 310, annotation program 117 annotates image 116 with tag 124. In the above example, tag 124 is appropriate because the user's sister Sue took a picture of the user with device 101, and Sue was in range with mobile phone 102.

In block 312, if the user determines in block 308 that tag 124 is inappropriate, then annotation program 117 deletes tag 124. Continuing with the above example, if the user instead went to the park with his friend Chris, but unbeknownst to the user, Sue's mobile phone 102 was within range of transceiver 110, then tag 124 reading "Sue" would not serve as a valuable reminder.

Figure 4:
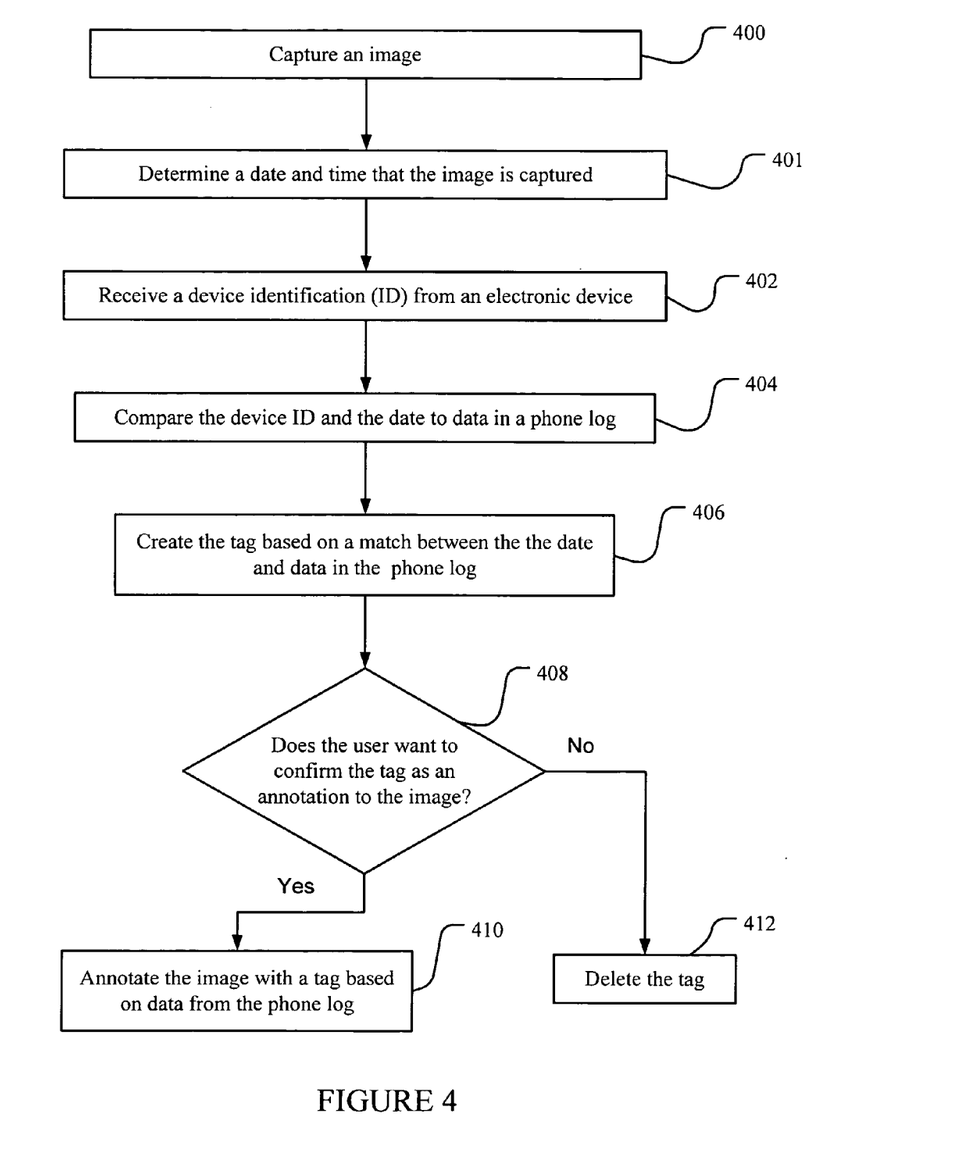
FIG. 4 is a flow diagram illustrating one method of implementing the invention with the system of FIG. 1.

FIG. 4 is a flow diagram illustrating a third embodiment for implementing the process of automatically annotating images using the system of FIG. 1. FIG. 4 is discussed along with the corresponding structure of FIG. 1. The process begins with image capture mechanism 104 capturing (taking) image 116, as described in block 400. In another example, image 116 is of a building captured on Mar. 3, 2001. Device 101 is, in this example, a mobile phone with a built in camera.

In block 401, annotation program 117 determines the date and time that image 116 is captured, from an internal clock (not shown), for example.

In block 402, device 101 receives device ID 114 from mobile phone 102. Harry has mobile phone 102. In this example, device ID 114 is the telephone number of mobile phone 102, which is 555-1234. One of ordinary skill in the art will recognize that many different device ID's are possible, the telephone number being one example of a device ID. Harry called the user on Mar. 3, 2001 for 2 minutes, to meet at the building in image 116. Device ID 114 is transmitted through the mechanism of the phone call to device 101, which in this example is also a mobile phone. Alternatively, device ID 114 may be received through the process described with respect to FIG. 3.

In block 404, annotation program 117 compares device ID 114 and the date to phone log 132. Phone log 132 includes entry 134. Entry 134 is dated Mar. 3, 2001, Harry, 2 minutes, which matches the date upon which image 116 was captured.

In block 406, annotation program 117 creates tag 124 that reads "Harry" because of the match between the date and entry 134 in phone log 132, using device ID 114 to identify Harry.

In block 408, annotation program 117 determines if the user wants to confirm tag 124 as an annotation to image 116. Block 408 is optional, as the user may turn off the confirm function, so that all tags are added. If the tag is appropriate, then in block 410, annotation program 117 annotates image 116 with tag 124. In the above example, tag 124 is appropriate because Harry called the user about meeting at the building and the user will remember that meeting.

In block 412, if the user determines in block 408 that tag 124 is inappropriate, then annotation program 117 deletes tag 124. Continuing with the above example, if the user had received or made a call to Harry prior to taking a picture of the building, but the two were unrelated, the user could have tag 124 deleted.

Figure 5:
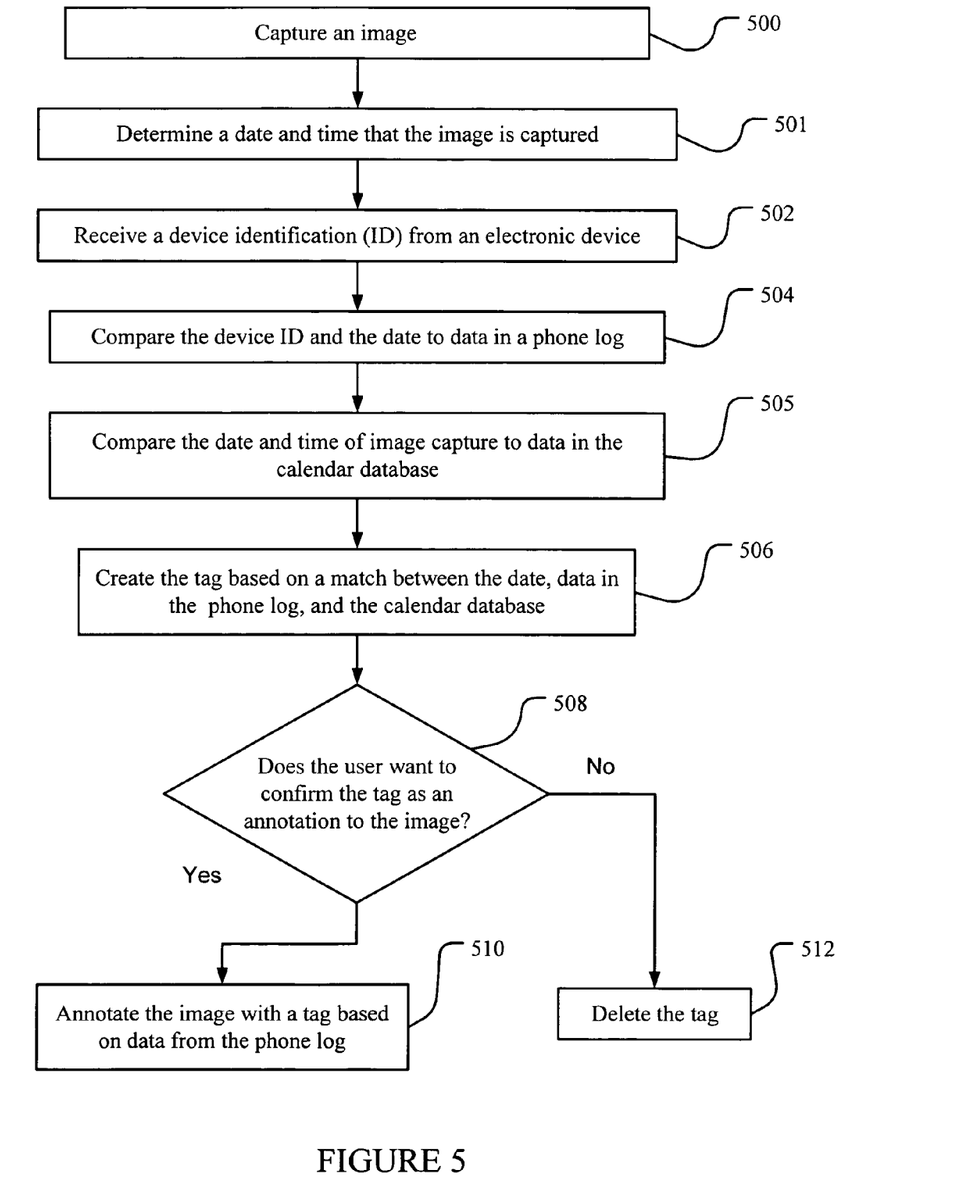
FIG. 5 is a flow diagram illustrating one method of implementing the invention with the system of FIG. 1.

Any combination of the above methods may be implemented with the invention. FIG. 5 is a flow diagram illustrating a fourth embodiment combining the above process of automatically annotating images using the system of FIG. 1. FIG. 5 is discussed along with the corresponding structure of FIG. 1. The process begins with image capture mechanism 104 capturing (taking) image 116, as described in block 500. In another example, image 116 is of a slot machine, captured on Mar. 18, 2001. Device 101 is, in this example, a mobile phone with a built in camera.

In block 501, annotation program 117 determines the date and time that image 116 is captured, from an internal clock (not shown), for example.

In block 502, device 101 receives device ID 114 from mobile phone 102. In this example, device ID 114 is the telephone number of mobile phone 102, which is 555-1234. The user called 555-6789 on Mar. 18, 2001, for 1 minute. Device ID 114 is transmitted through the mechanism of the phone call from device 101, which in this example is also a mobile phone.

In block 504, annotation program 117 compares device ID 114 and the date to phone log 132. Phone log 132 includes entry 136. Entry 136 is dated Mar. 18, 2001, 555-6789, 1 minutes. Optionally, address book 126 may be cross-referenced for device ID 114 to determine that it is associated with Sue, through entry 130 in address book 126.

In block 505, compare the data and time of image capture to data in the calendar database. Entry 124 in the calendar database reads "3/16/01-3/23/01: Trade conference," which as previously stated the user understands to mean that he is attending for that week the national trade conference on gambling and slot machines held in Las Vegas each year.

In block 506, annotation program 117 creates tag 124 that reads "Trade conference Sue" because of the match between the date and entry 136 in phone log 132, and a match between the date and entry 124 in calendar database 120.

In block 508, annotation program 117 determines if the user wants to confirm tag 124 as an annotation to image 116. Block 508 is optional, as the user may turn off the confirm function, so that all tags are added. If the tag is appropriate, then in block 510, annotation program 117 annotates image 116 with tag 124. Continuing with the above example, tag 124 is inappropriate because although the user is attending the tradeshow, he is not with Sue, who he happened to call on Mar. 18, 2001. However, the user can delete the "Sue" portion of tag 124 using conventional editing systems and instruct device 101 to annotate image 116 with amended tag 124, "Tradeshow." This will remind the user that he saw that slot machine at the annual tradeshow in Las Vegas.

In block 512, if the user determines in block 508 that tag 124 is inappropriate, then annotation program 117 deletes tag 124.

In a fifth embodiment, device 100 may be a desktop computer while image capture mechanism 104 is a portable camera, for example. The portable camera may link to the desktop computer and download images with date and time stamps. The desktop computer may then replace the date and time stamps with tag 124, in the manner described above.

Figure 6:
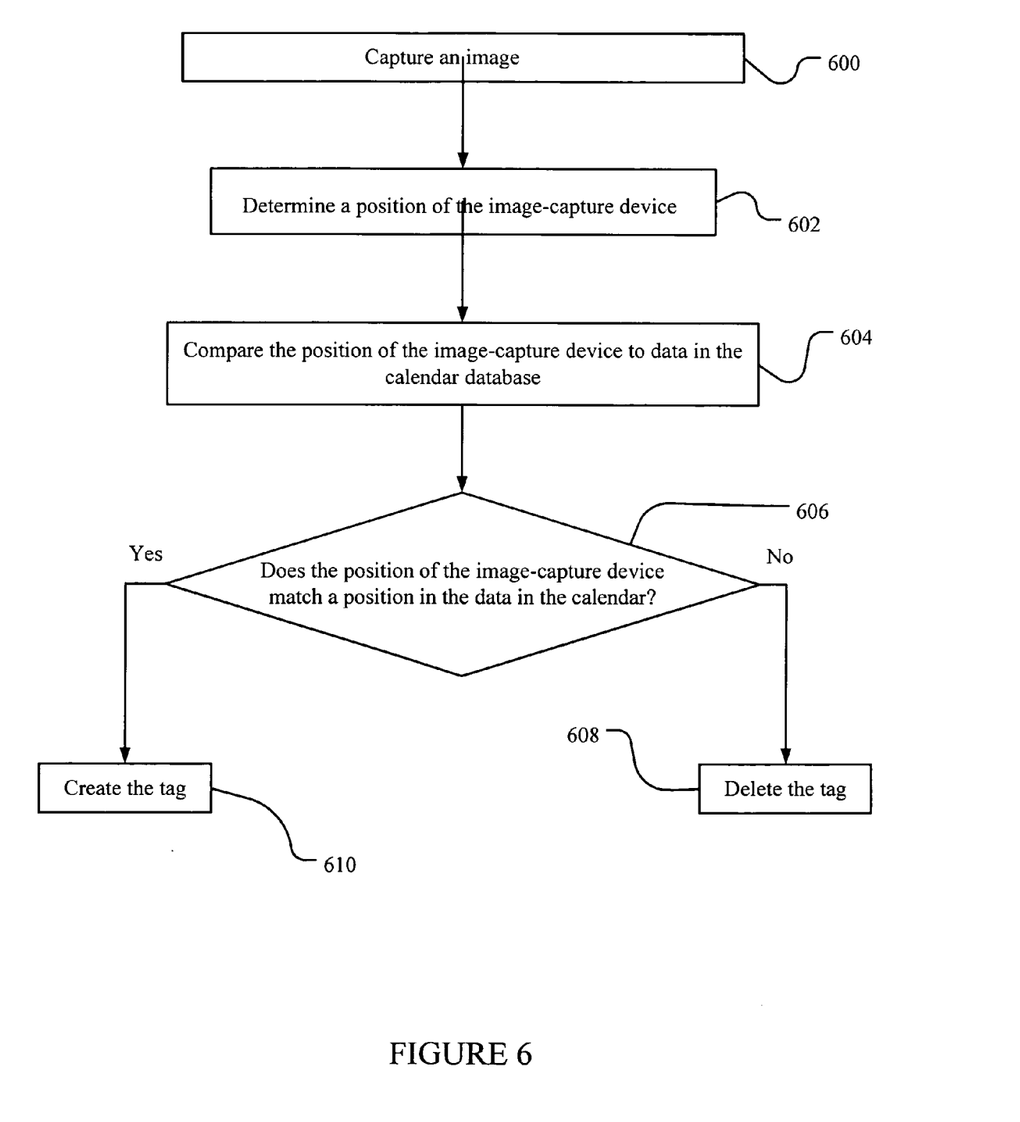
FIG. 6 is a flow diagram illustrating one method of implementing the invention with the system of FIG. 1.

FIG. 6 is a flow diagram illustrating a sixth embodiment of the process of automatically annotating images using the system of FIG. 1. FIG. 6 is discussed along with the corresponding structure of FIG. 1. The process begins with image capture mechanism 104 capturing (taking) image 116, as described in block 600. In another example, image 116 is taken in New Orleans. Device 101 is, in this example, a mobile phone with a built in camera.

In block 602, positioning system 150 determines a position of device 101. Positioning system 150 may be a Global Positioning System (GPS), a Wide Area Augmentation System (WAAS), or any other system providing location. Positioning system 150 may include mapping capability in order to relate position coordinates to a useful map position, for example a city or town.

In block 604, annotation program 117 compares the position of device 101 to location 152 in calendar database 120. Location 152 may be derived from an input field in calendar database 120 where the user may put in the location of an event. The user may enter a town, city, state, particular address, zip code, or other location to calendar database 120.

In block 606, annotation program 117 determines if the position of device 101 according to positioning system 150 matches location 152. In the example, image 116 was taken in New Orleans. If image 116 was taken during the week the user is at the trade conference in a previous example, and the user had entered location 152 as Las Vegas, then annotation program 117 would delete tag 124 in block 608 because New Orleans (as determined by positioning system 150) did not match Las Vegas (as determined by location 152).

If there was a match, or there was no data in location 152, then in block 610, annotation program 117 creates tag 124. The degree to which the two must match, or even whether the positioning option is available, is customizable by the user. For example, the user may decide that a match within 100 miles is acceptable, or that a match within 0.5 miles is required (within the limits of technology for positioning system 150).

Advantages of the invention include an annotation of images using data from a user-specific database, for example a phone log, an address book, and a calendar database. The words and information in the annotation are of the user's own choosing, so the annotations having meaning and value to the user and will be helpful when the user is trying to search for a particular image or trying to recall the circumstances surrounding the capture of an image they are viewing. Over the course of image management, a user may be able to view the annotations rather than have to open up each picture, especially when searching for a particular picture or type of picture.

According to the method and system disclosed herein, the present invention automatically annotates images from an image-capture device. A user may choose to cancel or edit the annotation, or the automated nature of it. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for automatically annotating images from an image-capture device comprising:
   capturing an image;
   receiving a device identification (ID) from an electronic device;
   comparing the device ID to data in a phone log;
   creating a tag based on a match between the device ID and the phone log data; and
   annotating the image with the created tag.

2. The method of claim 1 comprising determining a date and time that the image is captured, wherein comparing the device ID to data in a phone log includes comparing both the device ID and the date and time of image capture to the phone log data and creating a tag based on a match between the device ID and the phone log data includes creating the tag based on a match between the device ID, the date and time, and the phone log data.

3. The method of claim 1 comprising providing for user-confirmation of the tag as an annotation to the image.

4. The method of claim 1 wherein the tag includes words formed by the user.

5. The method of claim 1 wherein comparing the device ID to data in a phone log includes comparing the device ID to data in an address book and creating a tag based on a match between the device ID and the phone log data includes creating the tag based on a match between the device ID, the phone log data, and the address book data.

6. The method of claim 1 wherein the device ID is a telephone number.

7. The method of claim 1 wherein the tag includes a name associated with the electronic device.

8. The method of claim 1 wherein the phone log includes a list of recent messages and calls.

9. A computer readable medium embodying a computer program, executable by a machine, for automatically annotating images from an image-capture device, the computer program comprising executable instructions for:
   capturing an image;
   receiving a device identification (ID) from an electronic device;
   comparing the device ID to data in a phone log;
   creating a tag based on a match between the device ID and the phone log data; and
   annotating the image with the created tag.

10. The computer readable medium of claim 9 comprising determining a date and time that the image is captured, wherein comparing the device ID to data in a phone log includes comparing both the device ID and the date and time of image capture to the phone log data and creating a tag based on a match between the device ID and the phone log data includes creating the tag based on a match between the device ID, the date and time, and the phone log data.

11. The computer readable medium of claim 9 comprising providing for user-confirmation of the tag as an annotation to the image.

12. The computer readable medium of claim 9 wherein the tag includes words formed by the user.

13. The computer readable medium of claim 9 wherein comparing the device ID to data in a phone log includes comparing the device ID to data in an address book and creating a tag based on a match between the device ID and the phone log data includes creating the tag based on a match between the device ID, the phone log data, and the address book data.

14. The computer readable medium of claim 9 wherein the device ID is a telephone number.

15. The computer readable medium of claim 9 wherein the tag includes a name associated with the electronic device.

16. The computer readable medium of claim 9 wherein the phone log includes a list of recent messages and calls.

17. A system for automatically annotating images in an image-capture device comprising:
   an image capture mechanism configured to capture an image;
   a memory communicatively coupled to the image capture mechanism and configured to maintain a user-specific database including a phone log; and
   a transceiver configured to receive a device identification (ID) from an electronic device; and
   a processor communicatively coupled to the memory and the transceiver and configured to compare the device ID to data in the phone log and to annotate the image with a tag created based on a match between the device ID and the phone log data.

18. The system of claim 17 wherein the processor is configured to determine a date and time that the image is captured, compare both the device ID and the date and time of image capture to the phone log data, and create the tag based on a match between the device ID, the date and time, and the phone log data.

19. The system of claim 17 wherein the processor is configured to request user-confirmation of the tag as an annotation to the image.

20. The system of claim 17 wherein the tag includes words formed by the user.

21. The system of claim 17 wherein the user-specific database includes an address book and the processor is configured to compare the device ID to data in the address book and to create a tag based on a match between the device ID, the phone log data, and the address book data.

22. The system of claim 17 wherein the device ID is a telephone number.

23. The system of claim 17 wherein the tag includes a name associated with the electronic device.

24. The system of claim 17 wherein the phone log includes a list of recent messages and calls.

* * * * *